3,100,201
PROCESS FOR PURIFYING PROTEIN HYDROLYSATE SOLUTIONS

William O. Pool, Glendale, Calif., assignor to McGaw Laboratories, Inc., Glendale, Calif., a corporation of Delaware
No Drawing. Filed Dec. 22, 1959, Ser. No. 861,203
6 Claims. (Cl. 260—112)

My invention relates to a process for purifying protein hydrolysate solutions, and particularly to the removal of sodium ion and sulfate ion from such solutions.

Protein hydrolysates are used for solutions for intravenous administration, for food supplements, and for bacteriological media. Sulfuric acid is often used as the hydrolyzing agent. After hydrolysis, the sulfate ion is usually removed by precipitation of barium or calcium sulfate. Such precipitates are extremely fine however, and special techniques are needed to separate them from the solution. Moreover the hydrolysate must be washed from the precipitate, thus diluting the resultant solution. Ion exchange resins have also been used to remove sulfate ion. This method is expensive however, especially when the solution contains a large amount of sulfate ion.

Some sodium ion is present in most proteins and therefore in most protein hydrolysate solutions. Sodium ion may also be added as a hydrolyzing agent, as a neutralizing agent, or as an agent to increase the pH prior to an ammonia removing step. Sodium ion is difficult to remove because of the high solubility of most sodium ion salts. Sodium can be removed by ion exchange resins, but the cost is high if large quantities are present. Protein hydrolysates for intravenous injection should have low sodium ion contents.

It is therefore an object of this invention to provide an inexpensive process for removing sulfate ion or sodium ion from hydrolyzed protein solutions.

A further object of the invention is to provide a process for removing ammonium ions from protein hydrolysate solutions.

In the process of my invention, sulfate ion or sodium ion in the hydrolyzed protein solution is converted to sodium sulfate. The temperature of the solution is then reduced and the sodium sulfate is removed from the solution by crystallization of sodium sulfate decahydrate. The presence of a water-soluble organic solvent, such as acetone or ethyl alcohol, markedly increases the efficiency of the process.

In the practice of my invention, either sulfuric acid or sodium hydroxide may be used as a hydrolyzing agent. Sulfuric acid is inexpensive and effective. It also has a high boiling point so that relatively high temperatures may be used for hydrolysis without using pressurized vessels. Using 19 normal sulfuric acid the hydrolysis can be completed in a twenty-four hour period at a temperature of about 100° C. If color is an important factor, less concentrated sulfuric acid, such as three normal, may be used. In this case, somewhat larger quantities of sulfuric acid may be used for a given amount of protein and the time must be extended to obtain the desired degree of hydrolysis.

During the hydrolysis, 4 to 10% of the total nitrogen is converted to ammonium ion. It is generally desirable to remove as much of this ammonium ion as possible from the final product. This may be done by adding sufficient sodium hydroxide to the solution to neutralize the sulfuric acid and to adjust the pH to between 10 and 12. The solution is then concentrated under vacuum at an elevated temperature and ammonia gas drawn off. By removing the ammonium ion, the efficiency of the subsequent sulfate ion removal is also improved.

After removal of the ammonia, the pH is adjusted with sulfuric acid to between 3.5 and 8.0. The volume of the solution is then adjusted, in this instance by dilution, whereby the solution has a sulfate ion concentration of between about 1 and 20%. This dilution is necessary for a suitable separation in the subsequent steps. If the sulfate ion concentration is too low, little will be gained in the separation. If the sulfate ion concentration is too high, subsequent crystallization of sodium sulfate will entrap the small amount of solution and prevent separation of the liquid and solid phases.

The concentration of alpha-amino nitrogen is preferably between 2 and 5%. If the solution is more dilute, the sulfate ion removal will not be efficient and the ratio of sulfate ion to alpha-amino nitrogen in the final product will be high. Also, less humin, tyrosine, glutamic acid, and aspartic acid will be removed. If the concentration is too high, hydrolyzed protein will be lost by precipitation or entrapment.

The temperature of the solution is then reduced to between −20 and +10° C. Temperatures between −5 and −20° C. are preferred, but temperatures between −5 and +10° C. can be used. The temperature is preferably decreased slowly to promote the growth of a few large crystals. When the temperature is dropped rapidly, the crystals tend to trap an undesirably large amount of solution. When the solution has cooled sufficiently to be near saturation (usually about 20–30° C.), it is seeded with a small, hard crystal of sodium sulfate decahydrate. If the solution is supersaturated, the entire mixture may solidify, trapping the liquid. The solution is then further cooled and allowed to reach thermal equilibrium. This results in the formation of massive crystals of sodium sulfate decahydrate.

Considerable humin and tyrosine, and some aspartic and glutamic acids also precipitate. For the most part, these materials are trapped in the crystals of sodium sulfate decahydrate.

Precipitation of the humin, tyrosine, aspartic acid and glutamic acid is particularly effective in the pH range between 3.5 and 5.5. Elimination of these materials is a definite improvement over prior processes. Humin causes solutions to be dark in color. Tyrosine tends to precipitate from hydrolysate solutions on standing. Aspartic and glutamic acids tends to cause nausea when present in intravenously administered protein hydrolysates. The other amino acids and peptides are desirable constituents of protein hydrolysate solutions. Surprisingly, the losses of the desirable materials are very small in this process.

After crystallization of the sodium sulfate decahydrate is complete, the supernatant solution is poured off and filtered. As shown in the examples, most of the alpha-amino nitrogen content is in the supernatant solution. Most of the sodium ion and sulfate ion, on the other hand, are in the crystal phase.

If desired, the solution can be concentrated and the crystallization repeated to further reduce the amount of sodium ion and sulfate ion. Alternatively, the small amount of sulfate ion remaining in the solution may be removed by known methods, such as treatment with ion exchange resins or precipitation with barium hydroxide or barium chloride.

Crystallization of sodium sulfate decahydrate concentrates the solution by removing water. This concentration is particularly desirable when a dilute solution of hydrolyzed protein is being treated, or when a particularly concentrated final product is desired. Since aspartic and glutamic acids are removed, the desirable amino acids are concentrated considerably more than is indicated by alpha-amino nitrogen contents.

Efficiency of the sodium sulfate separation may be increased by adding from 5 to 50% of a water-soluble, organic solvent to the mixture. Suitable organic solvents include methyl alcohol, ethyl alcohol and acetone. The presence of such a solvent improves the precipitation of humin, glutamic acid and aspartic acid. The presence of the solvent also decreases the solubility of the sodium sulfate decahydrate thereby improving the separation of this material. The presence of the solvent further allows the temperature to be reduced to the range of −20 to −40° C., thus improving the effectiveness of the separation. Care must be taken at these temperatures however, not to precipitate desirable amino acids.

Despite the slow cooling of the solution, some hydrolyzed protein will be trapped in the crystalline mass of sodium sulfate decahydrate. If desired, this protein hydrolysate may be recovered by warming the mixture to 33° C. or more, thus transforming the sodium sulfate decahydrate to anhydrous sodium sulfate and water and releasing the trapped solution. The solution is then cooled, seeded, and the sodium sulfate decahydrate again crystallized out. The supernatant solution containing the protein hydrolysate may then be poured off.

There are several ways of measuring the effectiveness of the sulfate ion separation. In the examples, I use a ratio of the amount of sulfate ion to the amount of alpha-amino nitrogen. The less sulfate ion present, the lower the ratio. Since the treated hydrolysate solution is usually diluted to some definite concentration of alpha-amino nitrogen, the ratio is indicative of the sulfate ion content of the final solution.

For the purpose of this application, the process has been described in terms of a hydrolyzed protein solution. This solution can be either a completely hydrolyzed solution containing only amino acids or a partially hydrolyzed solution containing peptides and amino acids. It should be understood that the process of my invention is applicable to both types of protein hydrolysates and also to solutions of individual amino acids derived from protein hydrolysates.

The following examples will aid in understanding my invention, but are given only as illustrations. It will be understood that many modifications may be made without departing from the scope of my invention.

EXAMPLE 1

One hundred kilograms of casein were hydrolyzed with about 150 liters of approximately 60% (w./w.) sulfuric acid solution. The mixture was heated to 100° C. and the hydrolysis continued with agitation for about twenty-four hours. The mixture was then cooled to room temperature and filled into suitable glass containers.

These conditions of hydrolysis gave an almost complete hydrolysis without charring, and at the same time kept the amount of sulfuric acid as low as possible.

The resulting solution contained 5.7% (w./v.) alpha-amino nitrogen and 0.69% (w./v.) ammonia nitrogen. It was neutralized to pH 6.0 and diluted to provide neutralized hydrolysate solution (A) containing 2.0% (w./v.) alpha-amino nitrogen.

The neutralized hydrolysate solution was cooled to a temperature of about 30° C. and a crystal of sodium sulfate decahydrate added. The solution was then further cooled to approximately −4° C. and sodium sulfate decahydrate ($Na_2SO_4 \cdot 10H_2O$) crystallized out. The supernatant solution (B) was decanted rapidly from the crystals and filtered.

Solution was then allowed to drain off of the crystals for about two hours while the temperature rose to about 25° C. This solution was then filtered and designated as solution C. The crystals were dissolved in water to form solution D. As shown in Table I, the supernatant contained 76% of the alpha-amino nitrogen and only 16% of the sulfate ion. The ratio of sulfate ion to alpha-amino nitrogen was reduced from 8.4 in the hydrolysate to 1.7 in the supernatant. The supernatant also contained about one-third of the tyrosine and humin present in the hydrolysate solution, and the color was markedly reduced.

TABLE I

| Description | Sulfate ion | | Alpha-amino nitrogen (AAN) | | Ratio of sulfate ion/AAN |
|---|---|---|---|---|---|
| | Percent | Percent yield | Percent | Percent yield | |
| Hydrolysate (A) | 16.8 | | 2.0 | | 8.4 |
| Supernatant (B) | 3.3 | 16 | 1.94 | 76 | 1.7 |
| Drainings from crystals (C) | 7.7 | 10 | 1.54 | 16 | 5.0 |
| Redissolved crystals (D) | 7.0 | 68 | 0.11 | 8 | 65.5 |

EXAMPLE 2

Effect of Lower Crystallizing Temperature

A casein hydrolysate solution was neutralized to a pH of 7.0 with 50% sodium hydroxide solution. The resulting solution (A) contained 13.1% sulfate ion and 1.58% alpha-amino nitrogen. The mixture was then cooled to a temperature of about 20° C. and seeded with a crystal of sodium sulfate decahydrate. The mixture was then further cooled to −10° C. and kept at that temperature until thermal equilibrium was established. Massive crystals of sodium sulfate decahydrate formed. The solution was drawn off, and the container inverted and drained at an ambient temperature of −4° C. to provide a supernatant solution (B). The sodium sulfate decahydrate crystals adhered to the walls of the container and remained in the container trapping precipitated tyrosine and humin. The container was warmed to room temperature (about 22° C.) and again inverted and drained to provide solution (C). Ninety-two percent of the alpha-amino nitrogen and only 9% of the sulfate ion was present in the supernatant (B).

TABLE II

| Description | Sulfate ion | | Alpha-amino nitrogen (AAN) | | Ratio of sulfate ion/AAN |
|---|---|---|---|---|---|
| | Percent | Percent yield | Percent | Percent yield | |
| Neutralized hydrolysate (A) | 13.1 | | 1.58 | | 8.3 |
| Supernatant (B) | 1.89 | 9 | 2.36 | 92 | 0.8 |
| Drainings (C) | | | 0.83 | 1.9 | |
| Crystals (D) | | | 0.064 | 5.6 | |

EXAMPLE 3

Effect of 17% Alcohol

A casein hydrolysate solution containing a limited amount of sulfate ion was neutralized to a pH of 6.5 and diluted to provide a neutralized solution (A) containing 2.14% alpha-amino nitrogen and 3.76% sulfate ion. Ten liters of the neutralized solution was then treated with 2.2 liters of 95% (v./v.) alcohol, a crystal of sodium sulfate decahydrate added, the mixture cooled to −4.5° C. and the supernatant (B) decanted off. The supernatant was then filtered and analyzed. This procedure can be used to further reduce the sulfate ion content of the supernatant solution obtained in Example I or to remove small amounts of sulfate ion added to the solution to adjust the ph.

TABLE III

| Description | Sulfate ion | | Alpha-amino nitrogen (AAN) | | Ratio of sulfate ion/AAN |
|---|---|---|---|---|---|
| | Percent | Percent yield | Percent | Percent yield | |
| Neutralized hydrolysate (A) | 3.76 | | 2.14 | | 1.76 |
| Supernatant (B) | 1.85 | 54 | 1.86 | 95 | 1.0 |
| Redissolved crystals (C) | | 46 | | 4 | 18.5 |

EXAMPLE 4

Effect of 32% Alcohol

Five liters of 95% (v./v.) ethyl alcohol were added to 10 liters of a casein hydrolysate solution (A) having a pH of 5.1 and containing 2.35% alpha-amino nitrogen and 2.42% sulfate ion. The mixture was seeded with a crystal of sodium sulfate decahydrate, cooled to −17° C. with Dry Ice and the supernatant filtered off by vacuum. During filtration, the temperature of the solution rose slowly to 0° C. The filtered supernatant (B) contained 91% of the alpha-amino nitrogen originally in the hydrolysate solution (A) and 34% of the sulfate ion. This procedure can be used to further reduce the sulfate ion content of the supernatant solutions obtained in Examples 1 and 2.

TABLE IV

| Description | Sulfate ion | | Alpha-amino nitrogen (AAN) | | Ratio of sulfate ion/AAN |
|---|---|---|---|---|---|
| | Percent | Percent yield | Percent | Percent yield | |
| Hydrolysate solution (A) | 2.42 | -------- | 2.35 | -------- | 1.03 |
| Supernatant (B) | 0.75 | 34 | 2.16 | 91 | 0.35 |
| Redissolved crystals (C) | 4.92 | 67 | 0.66 | 9 | 7.5 |

EXAMPLE 5

Effect of 52% Alcohol

One liter of a protein hydrolysate solution (A) having a pH of 5.8, was mixed with 1.2 liters of 95% (v./v.) ethyl alcohol. The mixture was then seeded with sodium sulfate decahydrate, cooled to 0° C. and allowed to crystallize. The supernatant solution (B) was poured off, filtered, and analyzed. As shown in Table V the ratio of sulfate ion to alpha-amino nitrogen was reduced from 8.7 to 0.23 with 53% of the alpha-amino nitrogen and only 1.4% of the sulfate ion remaining in the supernatant solution (B).

TABLE V

| Description | Sulfate ion | | Alpha-amino nitrogen (AAN) | | Ratio of sulfate ion/AAN |
|---|---|---|---|---|---|
| | Percent | Percent yield | Percent | Percent yield | |
| Hydrolysate (A) | 19 | -------- | 2.2 | -------- | 8.7 |
| Supernatant (B) | 0.178 | 1.4 | 0.76 | 53 | 0.23 |
| Residue (C) | 4.83 | 96.6 | 0.27 | 47 | 18.3 |

If desired, the supernatant solution (B) can be made into a protein hydrolysate solution for intravenous use by diluting it to an alpha-amino nitrogen content of 0.5%. The sulfate ion content of this solution would be 0.12% which is suitable for intravenous administration.

EXAMPLE 6

Effect of Acetone

Three liters of acetone were added to seven liters of an amino acid solution (A) having a pH of 6.5 and containing 3.0% alpha-amino nitrogen and 5.0% sulfate ion. The mixture was seeded with a crystal of sodium sulfate decahydrate and cooled to −4° C. The supernatant solution (B) was then poured off of the crystalline residue (C), filtered, and analyzed. As shown in Table VI the ratio of sulfate ion to alpha-amino nitrogen was reduced from 1.67 to 0.76.

TABLE VI

| Description | Sulfate ion, percent | Alpha-amino nitrogen (AAN), percent | Ratio of sulfate ion/AAN |
|---|---|---|---|
| Amino acid solution (A) | 5.0 | 3.0 | 1.67 |
| Supernatant (B) | 1.49 | 1.97 | 0.76 |
| Redissolved crystals (C) | 4.42 | 0.39 | 11.2 |

EXAMPLE 7

Removal of Ammonia and Humin

One liter of protein hydrolysate solution was adjusted to pH 10.6 with 50% (w./w.) sodium hydroxide solution to give a solution containing 12.4% sulfate ion, 1.5% alpha-amino nitrogen, and 0.15% ammonia nitrogen. This solution was seeded with a crystal of sodium sulfate decahydrate, allowed to stand overnight at room temperature and the supernatant solution decanted from the crystals. The supernatant solution was then heated to between 60 and 70° C. and the pressure reduced to 3 to 4 inches of mercury for several hours to distill off ammonia. This procedure reduced the ammonium ion content to 0.007%.

The solution was then diluted to 0.95 liter, and 34 milliliters of concentrated sulfuric acid added to give a pH of approximately 3.3. The solution was then filtered to remove humin, seeded with a sodium sulfa decahydrate crystal, cooled to 6° C. and the solution poured off of the crystals thus formed. The solution was then cooled to −4.5° C., seeded, and more sodium sulfate decahydrate removed. As shown in Table VII, the ratio of sulfate ion to alpha-amino nitrogen was reduced from 8.25 to 1.1.

TABLE VII

| Description | Sulfate ion, percent | Alpha-amino nitrogen (AAN), percent | Ratio of sulfate ion/AAN |
|---|---|---|---|
| Hydrolysate (A) | 12.4 | 1.5 | 8.25 |
| Supernatant (B) | 3.5 | 3.2 | 1.1 |

When sodium sulfate is separated from a valuable amino acid such as threonine additional steps may be necessary to recover the amino acid. The following example illustrates how this is accomplished.

EXAMPLE 8

Recovery of Valuable Amino Acids

A solution of threonine (A) having a pH of 6.0 and containing 5.4% sulfate ion and 3.3% alpha-amino nitrogen was seeded with a sodium sulfate decahydrate crystal, and cooled to −4.5° C. After crystallization, the supernatant solution (B) was decanted from the crystals and the crystals drained.

The crystals were primarily sodium sulfate decahydrate, but also contained some trapped amino acid solution. The crystals were warmed to 35° C. to free the water of crystallization and the trapped solution. The solution was agitated, seeded with a crystal of sodium sulfate decahydrate, cooled to −4.5° C., allowed to crystallize, and the second supernatant (C) poured off.

The crystals were again heated, the solution seeded, cooled, crystallized, and the third supernatant solution (D) separated from the crystals. The procedure was repeated and the fourth supernatant solution (E) separated from the crystals (F).

As shown in Table VIII, 97% of the threonine was recovered in the first supernatant solution (B). Approximately 2% more was recovered in the subsequent supernatant solutions (C, D, E).

TABLE VIII

| Description | Sulfate ion | | Alpha-amino nitrogen (AAN) | | Ratio of sulfate ion/AAN |
|---|---|---|---|---|---|
| | Percent | Percent yield | Percent | Percent yield | |
| Original (A) | 5.4 | | 3.3 | | 1.63 |
| 1st supernatant (B) | 3.5 | 67 | 3.2 | 97 | 1.09 |
| 2nd Supernatant (C) | 3.6 | 2.5 | 1.9 | 1 | 1.90 |
| 3d supernatant (D) | 3.6 | 0.7 | 2.0 | 0.6 | 1.85 |
| 4th supernatant (E) | 3.7 | 0.5 | 2.0 | 0.4 | 1.88 |
| Crystals (F) | | 32 | | 0.2 | 280 |

I claim:

1. A process for removing sulfate ions from a sulfuric acid hydrolyzed casein solution comprising: neutralizing the sulfuric acid with sodium hydroxide to a pH of about 7.0; then adjusting the volume of the solution whereby the sulfate ion concentration thereof is between about 1 and 20%; then adjusting the solution temperature to between 20° and 30° C. and seeding the solution with a crystal of sodium sulfate decahydrate; then slowly reducing the temperature of the solution to between minus 20° and plus 10° C., whereby large individual crystals of sodium sulfate decahydrate are formed; and removing the supernatant solution of protein hydrolysate from the crystals of sodium sulfate decahydrate.

2. A process for preparing purified hydrolyzed casein solutions comprising: hydrolyzing the casein with sulfuric acid with formation of ammonium ions; then adding sodium hydroxide to the solution to adjust the pH to between 10 and 12; then evaporating the solution until the vapor is substantially free of ammonia; then adding sulfuric acid to the solution to adjust the pH to between 3.5 and 8.0; then adjusting the volume of the solution whereby the sulfate ion concentration thereof is between about 1 and 20%; then adjusting the solution temperature to between 20° and 30° C. and seeding the solution with a crystal of sodium sulfate decahydrate; then slowly reducing the temperature of the solution to between minus 20° and plus 10° C., whereby large individual crystals of sodium sulfate decahydrate are formed; and pouring off the supernatant casein hydrolysate solution from the crystals of sodium sulfate decahydrate.

3. A process for removing sulfate ions from a sulfuric acid hydrolyzed casein solution comprising: neutralizing the sulfuric acid with sodium hydroxide to a pH of about 7.0; then adjusting the volume of the solution whereby the sulfate ion concentration thereof is between about 1 and 20%; then adjusting the temperature to provide a solution substantially saturated with sodium sulfate and seeding the solution with a crystal of sodium sulfate decahydrate; then slowly reducing the temperature of the solution to between minus 20° and plus 10° C., whereby crystals of sodium sulfate decahydrate are formed; and removing the supernatant casein hydrolysate solution from said crystals of sodium sulfate decahydrate.

4. A process for removing sulfate ions from a sulfuric acid hydrolyzed casein as set forth in claim 3, wherein an organic solvent selected from the group consisting of water soluble, lower alkyl alcohols and acetone is added to the casein hydrolysate solution after neutralizing the sulfuric acid with sodium hydroxide and before adjusting the solution temperature and seeding with a crystal of sodium sulfate decahydrate.

5. A process for removing sulfate ions from a sulfuric acid hydrolyzed casein as set forth in claim 4, wherein the solvent is ethyl alcohol having a volume of 5 to 60% of the volume of the casein hydrolysate solution.

6. A process for preparing purified hydrolyzed casein solutions comprising: adding about 150 liters of approximately 60% w./w. sulfuric acid to each 100 kilograms of casein; then heating the mixture for approximately twenty-four hours at about 100° C. to hydrolyze the casein; then adding sodium hydroxide to the solution to adjust the pH to between 10 and 12; then evaporating the solution until the vapor is substantially free of ammonia; then adding sulfuric acid to the solution to adjust the pH to between 3.5 and 8.0; then adjusting the volume of the solution whereby the sulfate ion concentration thereof is between about 1 and 20%; then adjusting the solution temperature to between 20° and 30° C. and seeding the solution with a crystal of sodium sulfate decahydrate; then slowly reducing the temperature of the solution to between minus 20° and plus 10° C., whereby large individual crystals of sodium sulfate decahydrate are formed; and then decanting the supernatant casein hydrolysate solution from said crystals of sodium sulfate decahydrate.

References Cited in the file of this patent

UNITED STATES PATENTS

| 2,373,342 | Royal | Apr. 10, 1945 |
| 2,647,142 | Hoglan | July 28, 1953 |
| 2,909,564 | Hoglan | Oct. 20, 1959 |

OTHER REFERENCES

Hodgman et al.: "Handbook of Chemistry and Physics," Chemical Rubber Publishing Co. (37th ed.), 1955–1956, pages 598 to 599.

Cohn et al.: "Proteins, Amino Acids and Peptides," Reinhold Publishing Corp., New York, 1943, pages 199–200.

Copies of above in Library.